US011084089B2

United States Patent
Jeon (10) Patent No.: US 11,084,089 B2
(45) Date of Patent: Aug. 10, 2021

(54) METHOD OF MANUFACTURING WING ELEMENT AND METHOD OF MANUFACTURING BLADE

(71) Applicant: DOOSAN HEAVY INDUSTRIES & CONSTRUCTION CO., LTD., Changwon-si (KR)

(72) Inventor: Chae Hong Jeon, Seoul (KR)

( * ) Notice: Subject to any disclaimer, the term of this patent is extended or adjusted under 35 U.S.C. 154(b) by 91 days.

(21) Appl. No.: 16/600,572

(22) Filed: Oct. 14, 2019

(65) Prior Publication Data

US 2020/0171566 A1 Jun. 4, 2020

(30) Foreign Application Priority Data

Dec. 3, 2018 (KR) ........................ 10-2018-0153540

(51) Int. Cl.
*B22D 27/04* (2006.01)
*F01D 5/14* (2006.01)
*B28B 1/24* (2006.01)
*B33Y 80/00* (2015.01)

(52) U.S. Cl.
CPC .............. *B22D 27/045* (2013.01); *B28B 1/24* (2013.01); *B33Y 80/00* (2014.12); *F01D 5/147* (2013.01); *F05D 2220/32* (2013.01); *F05D 2230/50* (2013.01)

(58) Field of Classification Search
CPC ......... B22D 27/045; B28B 1/24; B33Y 80/00; B33Y 10/00; F05D 2220/32; F05D 2230/50; F05D 2230/31; F05D 2300/606; F05D 2300/607; F05D 2230/64; F01D 5/187; F01D 5/147; F01D 25/285
See application file for complete search history.

(56) References Cited

U.S. PATENT DOCUMENTS 4,416,321 A * 11/1983 Goddard .............. B22D 27/045
164/122.1
2013/0224008 A1 8/2013 Cheung et al.

FOREIGN PATENT DOCUMENTS

JP 2014-131816 A 7/2014
JP 2016-522750 A 8/2016

\* cited by examiner

*Primary Examiner* — Rick K Chang
(74) *Attorney, Agent, or Firm* — Harvest IP Law, LLP (57) ABSTRACT

A method of manufacturing a wing element that is provided inside a gas turbine and through which a fluid passes and a method of manufacturing a blade are provided. The method of manufacturing the wing element includes preforming the wing element; disposing the wing element inside a mold; sequentially melting the wing element inside the mold along one direction using a heating device; and solidifying the melted wing element using a cooling device.

18 Claims, 6 Drawing Sheets

METHOD OF MANUFACTURING WING ELEMENT AND METHOD OF MANUFACTURING BLADE

CROSS REFERENCE TO RELATED APPLICATION

This application claims priority to Korean Patent Application No. 10-2018-0153540, filed Dec. 3, 2018, the entire disclosure of which is incorporated herein by reference in its entirety.

BACKGROUND

Field

Apparatuses and methods consistent with exemplary embodiments relate to a method of manufacturing a wing element and a method of manufacturing a blade and, more particularly to a method of manufacturing a wing element that is provided inside a gas turbine and through which fluid passes, and a method of manufacturing a turbine blade of a wing element.

Description of the Related Art

A gas turbine includes a compressor, a combustor, and a turbine. The compressor includes multiple compressor vanes and multiple compressor blades which are alternately arranged in a compressor casing with an air inlet through which air is introduced. The introduced air is compressed by the compressor vanes and the compressor blades while passing through an inside of the compressor.

The combustor receives air compressed by the compressor, mixes the compressed air with fuel, and ignites the fuel-compressed air mixture using an igniter to produce high-temperature and high-pressure combustion gas which is supplied to the turbine.

The turbine includes multiple turbine vanes and multiple turbine blades which are alternately arranged in a turbine casing. The combustion gas produced by the combustor passes through an inside of the turbine. The combustion gas passing through the inside of the turbine rotates the turbine blades and exits the turbine through a turbine diffuser provided at a rear end of the turbine.

A gas turbine has no reciprocating component such as a piston that is usually provided in a four-stroke engine. That is, the gas turbine has no mutual friction part such as a piston-and-cylinder, thereby having the advantages that consumption of lubricant is extremely low and an operational stroke which is relatively long in common reciprocating mechanisms is reduced. Therefore, the gas turbine is advantageous in that an amplitude of vibration, which is a characteristic of reciprocating machines, is significantly reduced, and high-speed operation is possible to produce high-capacity power.

Meanwhile, the compressor vanes, the compressor blades, the turbine vanes, and the turbine blades have a common characteristic that a flowing fluid (e.g., compressed air or combustion gas) passes therethrough. Thus, the compressor vanes, the compressor blades, the turbine vanes, and the turbine blades may be defined as a "wing element".

In a related art gas turbine, a wing element is manufactured using a precision casting method. That is, the wing element is manufactured in such a manner that a core is disposed inside a mold and then molten metal is poured into the mold for solidification. Such a method is, however, problematic in that a manufacturing process of the core itself is complicated, and also excessive time and cost are required to manufacture the core.

Furthermore, in the related art gas turbine, the wing element may be manufactured using a technique of three-dimensional printing. In three-dimensional printing, provision of a core itself is not required and thus an overall manufacturing process is simple, which is advantageous over the precision casting method. However, a wing element manufactured by such a three-dimensional printing technique is problematic in that deteriorated characteristics in various physical properties such as strength, creep, heat resistance, and the like are exhibited compared to a wing element manufactured by the precision casting method.

SUMMARY

Aspects of one or more exemplary embodiments provide a method of manufacturing a wing element and a method of manufacturing a blade, whereby a product manufacturing process is simplified while improving physical properties of a manufactured product.

Additional aspects will be set forth in part in the description which follows and, in part, will become apparent from the description, or may be learned by practice of the exemplary embodiments.

According to an aspect of an exemplary embodiment, there is provided a method of manufacturing a wing element that is provided inside a gas turbine and through which a fluid passes, the method including: preforming the wing element; disposing the wing element inside a mold; sequentially melting the wing element inside the mold along one direction using a heating device; and solidifying the melted wing element using a cooling device.

The wing element may be preformed using a three-dimensional printing technique.

The method may further include after the preforming the wing element, attaching a reinforcing member to the wing element to prevent shrinkage due to solidification of the wing element.

The method may further include after the preforming the wing element, attaching a seed member having a single crystal structure to a portion of the wing element in which the melting is started.

The wing element may be melted along the one direction such that a crystallographic direction of the wing element may be aligned with a crystallographic direction of the seed member.

The method may further include after the disposing the wing element inside a mold, injecting ceramic slurry to an inside of the wing element and to a gap between the wing element and the mold for a solidification.

The heating device may include: a support disposed outside the mold and aligned in the one direction; and a heating portion provided at the support and heating the wing element inside the mold.

Each portion of the wing element disposed inside the mold may be sequentially melted while the heating portion is moved along the support in the one direction.

The cooling device may be provided at a portion of the mold in which the heating is started by the heating device, wherein after melting of the wing element is started by the heating device, the cooling device may be operated to sequentially solidify each portion of the wing element.

In the solidifying the melted wing element, the cooling device may be rotated about a central axis of the cooling device that is parallel to the one direction.

According to an aspect of another exemplary embodiment, there is provided a method of manufacturing a blade that is provided inside a gas turbine, the blade being rotated by combustion gas received from a combustor of the gas turbine and including airfoil, a platform on which the airfoil is seated, and a root member provided on a lower surface of the platform, the method including: preforming the blade; disposing the blade inside a mold; sequentially melting the blade inside the mold along one direction using a heating device; and solidifying the melted blade using a cooling device.

The blade may be preformed using a three-dimensional printing technique.

The method may further include after the preforming the blade, attaching a reinforcing member to the platform and the root member of the blade to prevent shrinkage due to solidification of the blade.

The method may further include after the preforming the blade, attaching a seed member having a single crystal structure to an end of the airfoil of the blade.

The blade may be melted from the end of the airfoil of the blade along the one direction such that a crystallographic direction of the blade may be aligned with a crystallographic direction of the seed member.

The method may further include after the disposing the blade inside the mold, injecting ceramic slurry to an inside of the blade and to a gap between the blade and the mold for solidification.

The heating device may include: a support disposed outside the mold and aligned in the one direction; and a heating portion provided at the support and heating the blade inside the mold.

In the disposing the blade inside the mold, the blade may be disposed such that an end of the airfoil of the blade faces toward a lower side of the mold, and in the sequentially melting the blade inside the mold, each portion of the blade disposed inside the mold may be sequentially melted while the heating portion is moved from the lower side to an upper side of the mold along the support.

In the disposing the blade inside the mold, the blade may be disposed such that an end of the airfoil of the blade faces toward a lower side of the mold, and in the sequentially melting the blade inside the mold, the cooling device may be disposed at the lower side of the mold, and after melting of the blade is started by the heating device, the cooling device may be operated to sequentially solidify each portion of the melted blade.

In the sequentially melting the blade inside the mold, the cooling device may be rotated about a central axis of the cooling device that is parallel to the one direction.

According to the method of manufacturing the wing element according to the exemplary embodiment, there is employed a process in which the wing element preformed by a method such as three-dimensional printing is disposed inside the mold, the slurry is injected to the inside and outside of the wing element for filling, and the wing element is melted and solidified. This makes it possible that preparation of a separate core is not required, thus simplifying a product manufacturing process.

Furthermore, according to the method of manufacturing the wing element according to the exemplary embodiment, the wing element is melted sequentially along one direction and solidified, thus making it possible that a single crystal structure is formed in a product, and thus the physical properties of the product is further improved.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification FIG. 1 is a cross-sectional view illustrating a gas turbine according to an exemplary embodiment.

Figure 1:
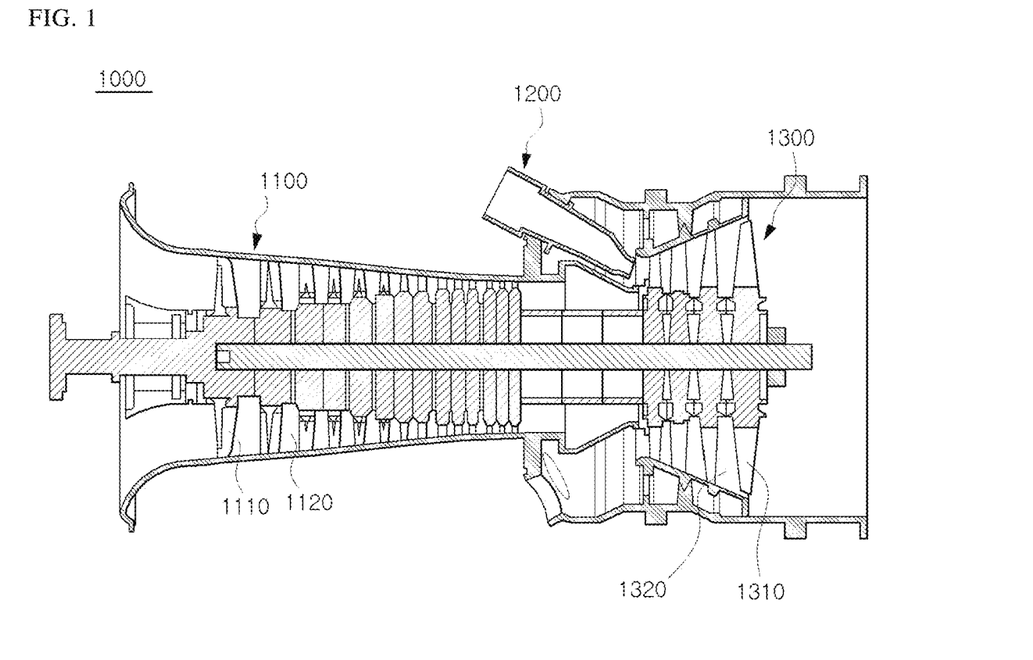
FIG. 1 is a cross-sectional view illustrating a gas turbine according to an exemplary embodiment.

Referring to FIG. 1, a gas turbine 1000 includes a compressor 1100, a combustor 1200, and a turbine 1300. Based on a flow direction of gas (e.g., compressed air or combustion gas), the compressor 1100 is disposed at an upstream side of the gas turbine 1000 and the turbine 1300 is disposed at a downstream side of the gas turbine 1000. The combustor 1200 is disposed between the compressor 1100 and the turbine 1300.

The compressor 1100 includes compressor vanes 1120 and compressor rotors in a compressor casing. The turbine 1300 includes turbine vane 1320 and turbine rotors in a turbine casing. The compressor vanes 1120 and the compressor rotors are arranged in a multi-stage arrangement along the flow direction of compressed air. The turbine vanes 1320 and the turbine rotors are arranged in a multi-stage arrangement along the flow direction of combustion gas. The compressor 1100 is designed such that an internal space is gradually decreased in size from a front stage to a rear stage so that air drawn into the compressor 1100 can be compressed. On the contrary, the turbine 1300 is designed such that an internal space is gradually increased in size from a front stage to a rear stage so that combustion gas received from the combustor 1200 can expand.

A torque tube for transmitting a rotational torque generated from the turbine 1300 to the compressor 1100 is disposed between a compressor rotor that is located at the rearmost stage of the compressor 1100 and a turbine rotor that is located at the foremost stage of the turbine 1300. FIG. 1 illustrates a case in which the torque tube includes multiple torque tube discs arranged in a three-stage arrangement, but it is understood that this is only an example and other exemplary embodiments are not limited thereto. For example, the torque tube may include multiple torque tube discs arranged in an arrangement of equal to or greater than four stages or an arrangement of equal to or less than two stages.

Each of the compressor rotors includes a compressor disc and compressor blades 1110 fastened to the compressor disc. That is, the compressor 1100 includes multiple compressor discs provided in the compressor casing, and respective compressor discs are coupled to each other by a tie rod to prevent axial separation in an axial direction. The compressor discs are arranged in the axial direction with the tie rod extending through central portions of the compressor disks. Adjacent compressor discs are arranged such that opposing surfaces thereof are in tight contact with each other by being tightly fastened by the tie rod so that the adjacent compressor discs cannot rotate relative to each other.

The compressor blades 1110 are radially coupled to an outer circumferential surface of each of the compressor discs in a row. The compressor vanes 1120 are provided on an inner circumferential surface of the compressor casing in an annular row in each stage, and rows of the compressor vanes 1120 are arranged between rows of the compressor blades 1110. While the compressor discs rotate along with a rotation of the tie rod, the compressor vanes 1120 are fixed to the compressor casing so as not to rotate. The compressor vanes 1120 guide the flow of compressed air moved from front-stage compressor blades to rear-stage compressor blades. Herein, the compressor casing and the compressor vanes 1120 may be collectively referred to as a "compressor stator" so as to be distinguished from the compressor rotors.

The tie rod is disposed to penetrate central portions of the multiple compressor discs and turbine discs, one end of the tie rod is fastened into a compressor disc located at the foremost stage of the compressor 1100, and an opposite end is fastened in the torque tube by a fastening nut.

It is understood that the tie rod is not limited to the example illustrated in FIG. 1, and may be changed or vary according to one or more other exemplary embodiments. For example, there are three types of tie rods: a single-type in which one tie rod may penetrate the central portions of the compressor discs; a multi-type in which multiple tie rods may be arranged circumferentially; and a complex type in which the single-type and the multi-type may be combined.

Also, a desworler serving as a guide vane is provided in the compressor 1100 of the gas turbine 1000 to adjust an actual inflow angle of the fluid entering into an inlet of the combustor 1200 to a designed inflow angle.

The combustor 1200 mixes the introduced compressed air with fuel to produce high-temperature and high-pressure combustion gas having high energy, and increases the temperature of the combustion gas to a heat-resistant temperature limit at which the combustor and turbine components are able to withstand in an isothermal combustion process.

A plurality of combustor constituting a combustion system of the gas turbine may be arranged in a combustor casing formed in a cell shape. Each of the combustors includes a nozzle for injecting fuel, a liner defining a combustion chamber, and a transition piece serving as a connector between the combustor and the turbine.

The liner provides a combustion space in which fuel injected from the nozzle is mixed with the compressed air supplied from the compressor for combustion. The liner includes a combustion chamber that provides the combustion space in which the fuel mixed with the compressed air is combusted, and a liner annular channel that defines an annular space while surrounding the combustion chamber. The nozzle for injecting fuel is coupled to a front end of the liner, and an igniter plug is coupled to a side wall of the liner.

An outer wall of the liner is provided with multiple holes through which the compressed air is introduced into the liner annular channel, and the introduced compressed air cools the liner while flowing toward the transition piece. On the other hand, cooling air (i.e., the compressed air) introduced into the transition piece flows toward the annulus channel of the liner after cooling the transition piece. Because the compressed air flows along the outer wall of the liner, it is possible to prevent the heat of the combustion gas generated in the combustor chamber from causing damage to the liner.

The transition piece is connected to a rear end of the liner to transfer combustion gas toward the turbine. The transition piece includes a transition piece annular channel surrounding an internal space thereof. The compressed air flows through the annular channel of the transition piece, thereby cooling an outer wall of the transition piece to prevent the transition piece from being damaged by high-temperature combustion gas.

The high-temperature and high-pressure combustion gas supplied from the combustor 1200 flows into the turbine 1300 and expands while passing through the inside of the turbine 1300, thereby applying an impulsive force or reaction force to the turbine blades 1310 to generate a rotational torque. A portion of the rotation torque is transmitted to the compressor via the torque tube, and a remaining portion of the torque is used to drive a generator or the like.

The turbine 1300 fundamentally is similar to the compressor 1100 in structure. That is, the turbine 1300 includes multiple turbine rotors similar to the compressor rotors, and the turbine rotor includes a turbine disc and multiple turbine blades 1310 radially arranged on the turbine disc in a row. Multiple turbine vanes 1320 are provided on an inner circumferential surface of the turbine casing in an annular row in each stage, and rows of the turbine vanes 1320 are arranged between rows of the turbine blades 1310. The turbine vanes 1320 guide the flow direction of combustion gas passing through the turbine blades 1310. Herein, the turbine casing and the turbine vanes 1320 may be collectively referred to as a "turbine stator" so as to be distinguished from the turbine rotors.

Furthermore, the compressor blades 1110, the compressor vanes 1120, the turbine blades 1310, and the turbine vanes 1320 have a common characteristic that a flowing fluid (e.g., compressed air or combustion gas) passes therethrough. Thus, the compressor blades 1110, the compressor vanes 1120, the turbine blades 1310, and the turbine vanes 1320 may be collectively referred to as a "wing element".

Figure 2:
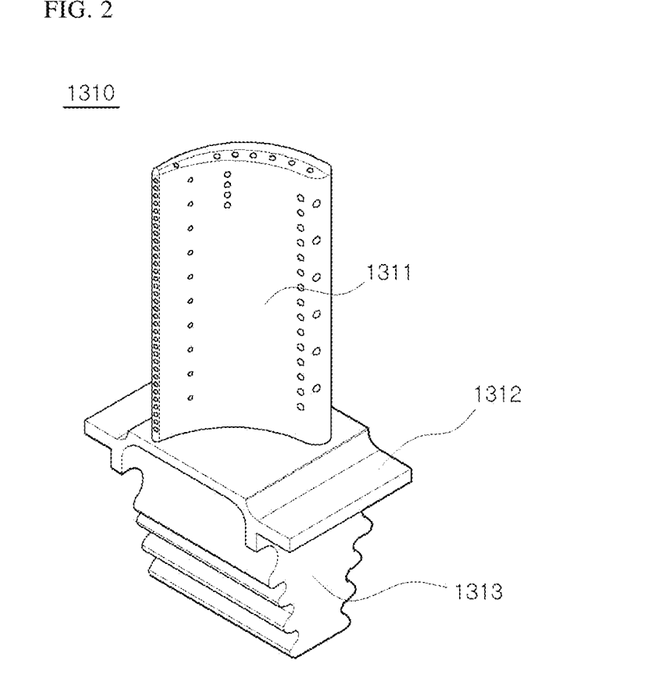
FIG. 2 is a view illustrating a turbine blade of a wing element according to an exemplary embodiment.

FIG. 2 is a view illustrating a turbine blade of a wing element according to an exemplary embodiment. The turbine disc has a disc shape and includes multiple turbine disc slots that are formed in an outer circumferential surface thereof. Referring to FIG. 2, the turbine blade 1310 provided on a radial outer side of the turbine disc includes a root member 1313 inserted into each of the turbine disc slots, a platform 1312 coupled to a radial outer side of the root member 1313, and an airfoil 1311 coupled to a radial outer side of the platform 1312 and rotating by combustion gas.

The platform 1312 fixes the airfoil 1311 to the root member 1313. The platform 1312 is configured such that a side surface thereof is in contact with an adjacent platform 1312, thus serving to maintain a distance between adjacent turbine blades 1310. FIG. 2 illustrates a case in which the platform 1312 has a planar shape, but it is understood that this is only an example and other exemplary embodiments are not limited thereto.

The root member 1313 coupled to each of the turbine disc slots is provided on a lower surface of the platform 1312. The root member 1313 has a shape corresponding to the shape of a curved surface formed in the turbine disc slot. The shape of the root member 1313 may be selected according to a required structure of a commercially available gas turbine, and may be a commonly-known dovetail or fir-tree shape.

Examples of a coupling method of the root member 1313 includes a tangential type inserted into the turbine disc slot along a tangential direction of an outer circumferential surface of the turbine disc and an axial type inserted into the turbine disc slot along an axial direction of the turbine disc. In some cases, the turbine blade 1310 may be coupled to the turbine disc using a fastener other than such types, such as a key or bolt.

The airfoil 1311 is provided on an upper surface of the platform 1312. The airfoil 1311 has a profile optimized according to specification of the gas turbine and includes a leading edge disposed at an upstream side based on the flow direction of combustion gas, and a trailing edge disposed at a downstream side.

Herein, unlike the compressor blades, the turbine blade 1310 comes into direct contact with high-temperature and high-pressure combustion gas. Because combustion gas has a high temperature of about 1700° C., a cooling means is required. To this end, a bleeding channel for feeding compressed air extracted out of a portion of the compressor to the turbine blade 1310 is provided.

The bleeding channel may extend outward of the casing (i.e., an outer channel), extend through insides of the compressor discs (i.e., an inner channel), or both the outer and inner channels may be used. In FIG. 2, multiple film cooling holes are formed in the surface of the airfoil 1311. The film cooling holes are in communication with a cooling channel formed inside the airfoil 1311 to serve to feed compressed air to the surface of the airfoil 1311.

Figure 3:
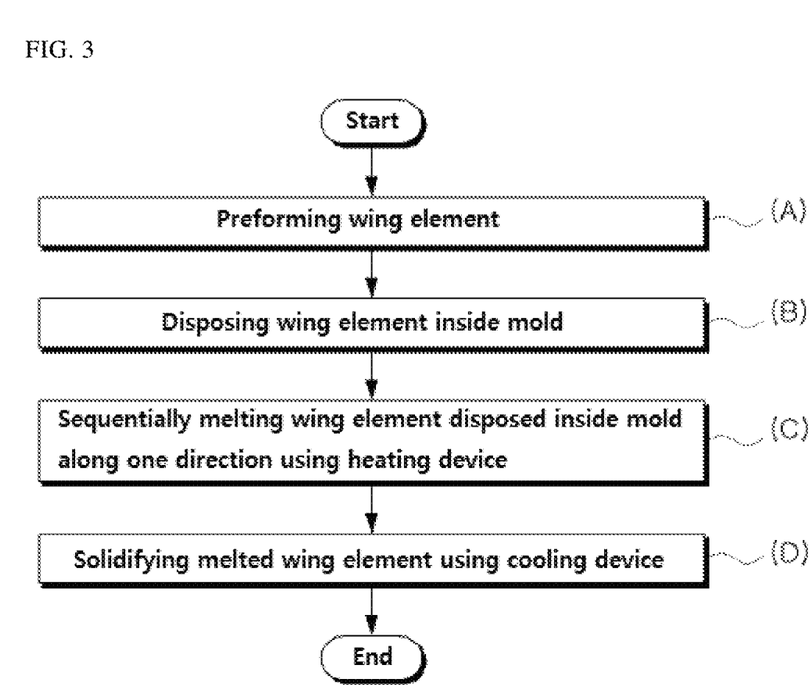
FIG. 3 is a flowchart illustrating a method of manufacturing a wing element according to an exemplary embodiment.
Figure 4:
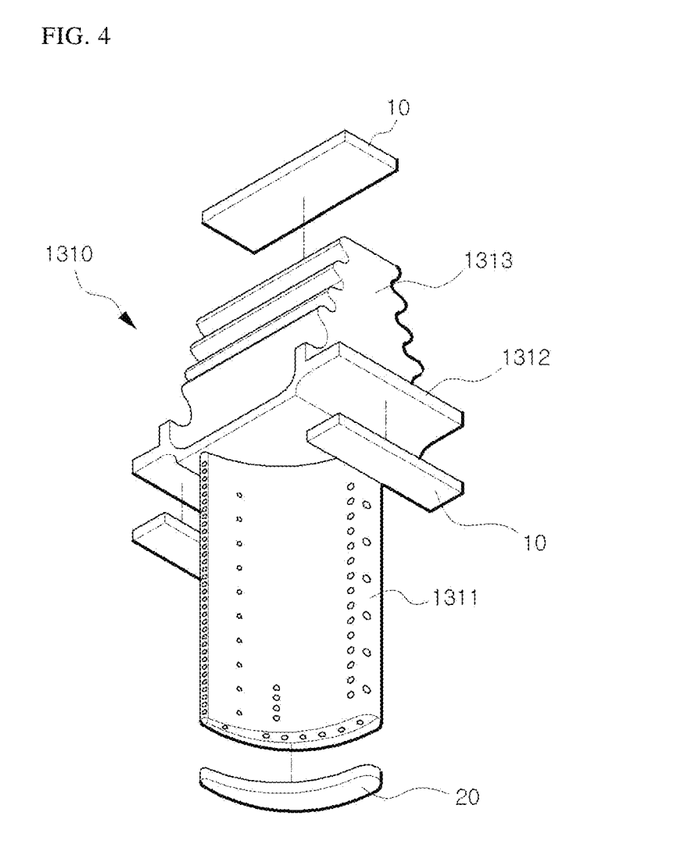
FIG. 4 is a view illustrating a state in which a reinforcing member and a seed member are attached to the wing element (turbine blade) according to an exemplary embodiment.
Figure 5:
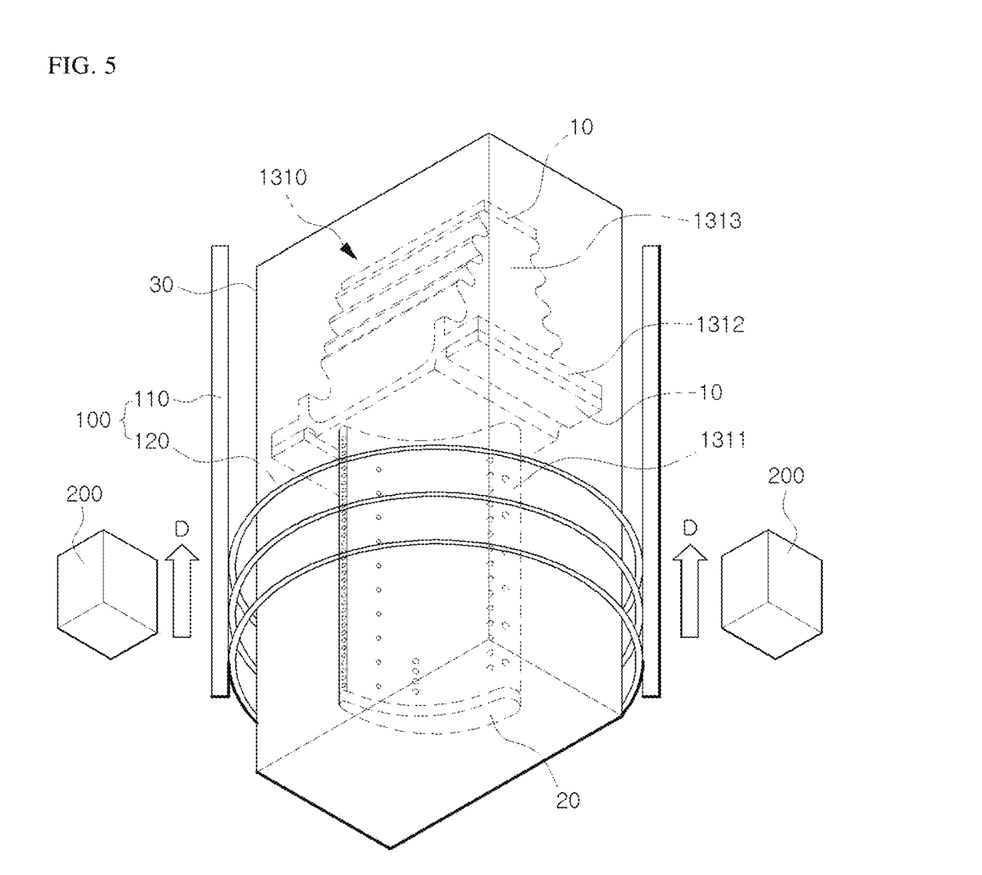
FIG. 5 is a view illustrating a state in which the wing element (turbine blade) is disposed inside a mold according to an exemplary embodiment.

FIG. 3 is a flowchart illustrating a method of manufacturing a wing element according to an exemplary embodiment, FIG. 4 is a view illustrating a state in which a reinforcing member and a seed member are attached to the wing element (turbine blade) according to an exemplary embodiment, and FIG. 5 is a view illustrating a state in which the wing element (turbine blade) is disposed inside a mold according to an exemplary embodiment. Hereinafter, a method of manufacturing a wing element according to a first exemplary embodiment will be described in detail with reference to FIGS. 3 to 5.

Referring to FIG. 3, the method of manufacturing the wing element includes preforming a wing element (operation A), disposing the wing element inside a mold (operation B), sequentially melting the wing element disposed inside the mold along one direction using a heating device (operation C), and solidifying the melted wing element using cooling devices (operation D). The wing element is manufactured using a three-dimensional printing technique. The three-dimensional printing technique is a manufacturing technique for creating a three-dimensional object while laying down continuous layers of material, also called additive manufacturing (AM). The wing element is preformed using the three-dimensional printing technique, and then the following operations are applied to the preformed wing element to manufacture a wing element having a shape of a finished product.

Referring to FIG. 4, after the operation A, a reinforcing member 10 and a seed member 20 are attached to the wing element. The reinforcing member 10 is to compensate for a decrease in volume of the wing element when the wing element is melted and solidified and a manufacturing process is finally completed. Accordingly, the reinforcing member 10 may be referred to as a configuration provided to prevent the wing element from being reduced in the volume from a desired volume when solidified after melting. If the wing element is a turbine blade 1310 (hereinafter referred to as a blade), the reinforcing member 10 may be attached to a platform 1312 and a root member 1313 of the blade 1310.

The seed member 20 has a single crystal structure and is attached to a portion of the wing element in which melting starts. Here, the single crystal structure means a solid in which unit cells are repeated in an ordered arrangement along a constant crystal axis to form an entire crystal. The single crystal structure exhibits anisotropy such as piezoelectricity, birefringence, and the like and is excellent in various properties such as strength, creep, heat resistance, and the like. The seed member 20 is a configuration provided to form the wing element into a single crystal structure in a melting process of the wing element.

Referring to FIG. 5, after the reinforcing member 10 and the seed member 20 are attached to the wing element, the wing element is disposed inside a mold 30 (operation B). If the wing element is the blade 1310, an end of an airfoil 1311 of the blade 1310 is disposed so as to face toward a lower side of the mold 30. After the wing element is disposed inside the mold 30, ceramic slurry is injected to an inside of the wing element and to an outside of the wing element (i.e., a gap between the wing element and the mold 30) and solidified.

An outer shape of the wing element preformed in operation A and an inner shape of the mold 30 may be formed such that the wing element and the mold 30 are not in complete contact with each other. That is, even when the wing element preformed in operation A is disposed inside the mold 30, a gap may be generated between the wing element and an inner surface of the mold 30. Thus, injecting the slurry to the outside of the wing element is to fill the gap.

Furthermore, a channel is formed inside the wing element for cooling and other purposes. Thus, the slurry is also injected to the inside of the wing element such that the channel remains inside the wing element even after a melting and solidification process. The slurry injected to the inside of the wing element is solidified in connection with the slurry injected to the outside of the wing element. Even when the wing element is melted later, the slurry remains solidified, causing the channel to remain inside the wing element even after the wing element is solidified.

In manufacturing of the wing element through a precision casting method in the related art, a fabricator prepares a solid core to be placed inside a mold in advance, then places the core inside the mold, and finally injects liquid metal into the mold. The method is problematic in that the solid core for forming the channel inside the wing element needs to be precisely prepared in advance, and thus the entire product manufacturing process is very complicated, and further the process takes considerable time and effort.

However, according to an exemplary embodiment, if the wing element is preformed by the three-dimensional printing technique using a computer, then the preformed wing element is placed inside the mold 30, and finally the slurry in a mixed state of liquid and solid is injected to the inside and outside of the wing element and solidified, the slurry serves as the core in the precision casting method in the related art. Thus, according to the method of manufacturing the wing element according to the exemplary embodiment, it is possible to manufacture a product easily, without having to precisely preparing a core having a shape corresponding to the shape of the channel inside the wing element.

After injecting the slurry to the inside and outside of the wing element, the wing element disposed inside the mold 30 is melted sequentially along one direction D using a heating device 100 provided outside the mold 30 (operation C). The heating device 100 includes supports 110 and a heating portion 120. The supports 110 have a rod shape, and each of the supports 110 is disposed outside the mold 30 along a longitudinal direction of the mold 30.

The heating portion 120 is provided at the supports 110 to heat the wing element inside the mold 30. The heating portion 120 has a shape surrounding the outside of the mold 30 along a circumferential direction of the mold 30, with a height lower than the height of the mold 30. The heating portion 120 sequentially heating each portion of the wing element inside the mold 30 while moving along the one direction D.

Here, the one direction D is a direction from a lower side to an upper side of the mold 30, that is, a longitudinal direction of the support 110 or a longitudinal direction of the mold 30. If the wing element is the blade 1310, the one direction D is a direction from an end of the airfoil 1311 of the blade 1310 to an end of the root member 1313 of the blade 1310.

If the heating portion 120 melts the wing element while moving along the one direction D, and then the wing element is solidified by a solidification process, a crystallographic direction of the wing element is aligned with a crystallographic direction of the seed member 20 present at the point in which melting of the wing element starts. Thus, according to the method of manufacturing the wing element according to the exemplary embodiment, because the wing element of a polycrystalline structure is preformed using an easy technique such as three-dimensional printing and then the wing element is melted in the one direction D by the heating portion 120 and solidified, it is possible to manufacture a wing element of single crystal structure having excellent physical properties.

After the wing element disposed inside the mold 30 is sequentially melted, the melted wing element is solidified using cooling devices 200 (operation D). The cooling devices 200 are arranged outside the mold 30. The cooling devices 200 cool the melted wing element sequentially along one directions D. In this case, the wing element is aligned along the crystallographic direction of the seed member 20 to form a single crystal structure.

Hereinafter, a method of manufacturing a wing element according to a second exemplary embodiment will be described in detail with reference to FIG. 6. The second exemplary embodiment will be described by focusing only on operation D, which is different from the first exemplary embodiment.

Figure 6:
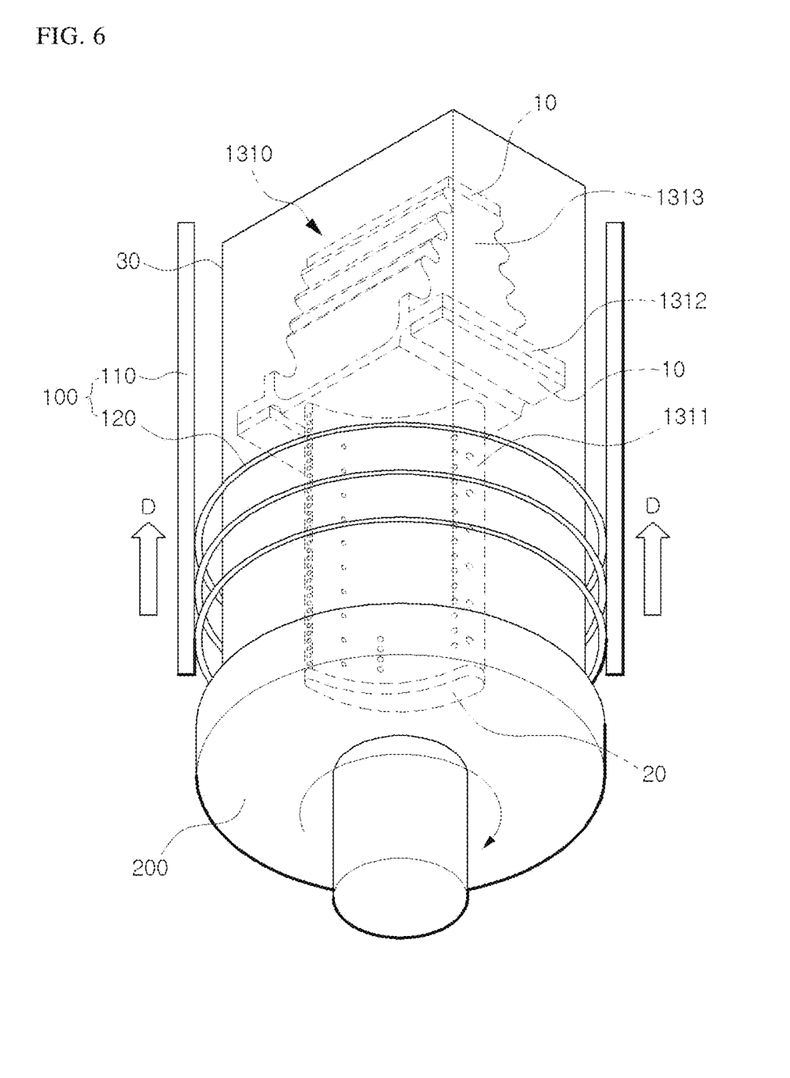
FIG. 6 is a view illustrating a state in which the wing element (turbine blade) is disposed inside the mold according to another exemplary embodiment.

Referring to FIG. 6, a cooling device 200 is provided at a portion of a mold 30 in which heating is started by a heating device 100, that is, at a lower side of the mold 30. After melting of a wing element is started along one direction D by the heating device 200, the cooling device 200 sequentially cools each portion of the melted wing element along the one direction D from a lower portion of the wing element.

The cooling device 200 has a disc-shaped portion in which the lower side of the mold 30 is located. The cooling device 200 is rotatable about a central axis of the cooling device 200 that is parallel to the one direction D, that is, the central axis of the cooling device 200 that is parallel to a longitudinal direction of the mold 30 or to a longitudinal direction of the wing element. In this case, it is ensured that a lower portion of the wing element is cooled evenly, and the other portions of the wing element are also cooled sequentially evenly.

Thus, according to the method of manufacturing the wing element according to the exemplary embodiment, it is possible to solidify the melted wing element more effectively along the one direction D, and to manufacture a wing element that is excellent in physical properties.

As described above, according to the method of manufacturing the wing element according to the exemplary embodiment, there is employed a process in which the wing element preformed by a method such as three-dimensional printing is disposed inside the mold 30, the slurry is injected to the inside and outside of the wing element for filling, and the wing element is melted and solidified. This makes it possible that preparation of a separate core is not required, thus simplifying a product manufacturing process, which is advantageous over a related art manufacturing method of a wing element. Furthermore, according to the method of manufacturing the wing element according to the exemplary embodiment, the wing element is melted sequentially along one direction and solidified, thus making it possible that a single crystal structure is formed in a product, and thus the physical properties of the product is further improved.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A method of manufacturing a wing element that is provided inside a gas turbine and through which a fluid passes, the method comprising:
   preforming the wing element;
   disposing the wing element inside a mold;
   sequentially melting the wing element inside the mold along one direction using a heating device;
   solidifying the melted wing element using a cooling device; and
   after the performing the wing element, attaching a seed member having a single crystal structure to a portion of the wing element in which the melting is started.

2. The method of claim 1, wherein the wing element is preformed using a three-dimensional printing technique.

3. The method of claim 1, further comprising:
   after the preforming the wing element,
   attaching a reinforcing member to the wing element to prevent shrinkage due to a solidification of the wing element.

4. The method of claim 1, wherein the wing element is melted along the one direction such that a crystallographic direction of the wing element is aligned with a crystallographic direction of the seed member.

5. A method of manufacturing a wing element that is provided inside a gas turbine and through which a fluid passes, the method comprising:
performing the wing element;
disposing the wing element inside a mold;
sequentially melting the wing element inside the mold along one direction using a heating device;
solidifying the melted wing element using a cooling device; and
after the disposing the wing element inside the mold,
injecting ceramic slurry to an inside of the wing element and to a gap between the wing element and the mold for a solidification.

6. The method of claim 1, wherein the heating device includes:
a support disposed outside the mold and aligned in the one direction; and
a heating portion provided at the support and heating the wing element inside the mold.

7. The method of claim 6, wherein each portion of the wing element disposed inside the mold is sequentially melted while the heating portion is moved along the support in the one direction.

8. The method of claim 1, wherein the cooling device is provided at a portion of the mold in which the heating is started by the heating device, and
wherein after melting of the wing element is started by the heating device, the cooling device is operated to sequentially solidify each portion of the wing element.

9. The method of claim 8, wherein in the solidifying the melted wing element, the cooling device is rotated about a central axis of the cooling device that is parallel to the one direction.

10. A method of manufacturing a blade that is provided inside a gas turbine, the blade being rotated by combustion gas received from a combustor of the gas turbine and including an airfoil, a platform on which the airfoil is seated, and a root member provided on a lower surface of the platform, the method comprising:
preforming the blade;
disposing the blade inside a mold;
sequentially melting the blade inside the mold along one direction using a heating device;
solidifying the melted blade using a cooling device;
after the performing the blade, attaching a seed member having a single crystal structure to an end of the airfoil of the blade.

11. The method of claim 10, wherein the blade is preformed using a three-dimensional printing technique.

12. The method of claim 10, further comprising:
after the preforming the blade,
attaching a reinforcing member to the platform and the root member of the blade to prevent shrinkage due to a solidification of the blade.

13. The method of claim 10, wherein the blade is melted from the end of the airfoil of the blade along the one direction such that a crystallographic direction of the blade is aligned with a crystallographic direction of the seed member.

14. The method of claim 10, further comprising:
after the disposing the blade inside the mold,
injecting ceramic slurry to an inside of the blade and to a gap between the blade and the mold for solidification.

15. The method of claim 10, wherein the heating device includes:
a support disposed outside the mold, and aligned in the one direction; and a heating portion provided at the support and heating the blade inside the mold.

16. The method of claim 15, wherein in the disposing the blade inside the mold, the blade is disposed such that an end of the airfoil of the blade faces toward a lower side of the mold, and
wherein in the sequentially melting the blade inside the mold, each portion of the blade disposed inside the mold is sequentially melted while the heating portion is moved from the lower side to an upper side of the mold along the support.

17. The method of claim 10, wherein in the disposing the blade inside the mold, the blade is disposed such that an end of the airfoil of the blade faces toward a lower side of the mold, and
wherein in the sequentially melting the blade inside the mold, the cooling device is disposed at the lower side of the mold, and after melting of the blade is started by the heating device, the cooling device is operated to sequentially solidify each portion of the melted blade.

18. The method of claim 17, wherein in the sequentially melting the blade inside the mold, the cooling device is rotated about a central axis of the cooling device that is parallel to the one direction.

* * * * *